HEAD ASSEMBLY IN A MAGNETIC TAPE RECORDER

Filed Nov. 16, 1960 4 Sheets-Sheet 1

HEAD ASSEMBLY IN A MAGNETIC TAPE RECORDER

Filed Nov. 16, 1960 4 Sheets-Sheet 2

June 22, 1965 KATSUYA ATSUMI 3,190,970
HEAD ASSEMBLY IN A MAGNETIC TAPE RECORDER
Filed Nov. 16, 1960 4 Sheets-Sheet 3
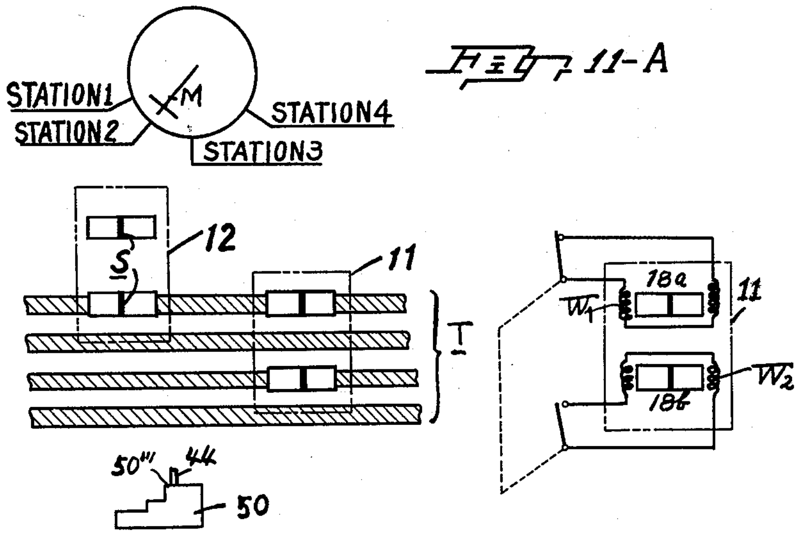
FIG. 11-A
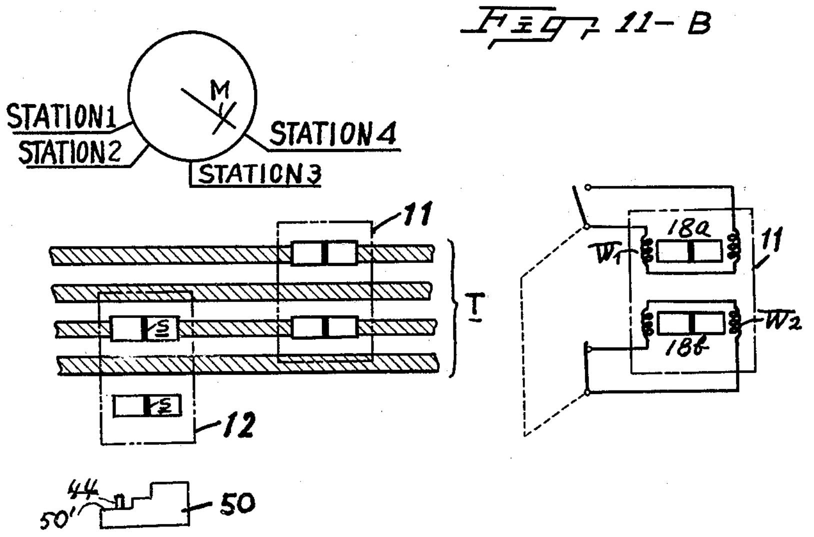
FIG. 11-B

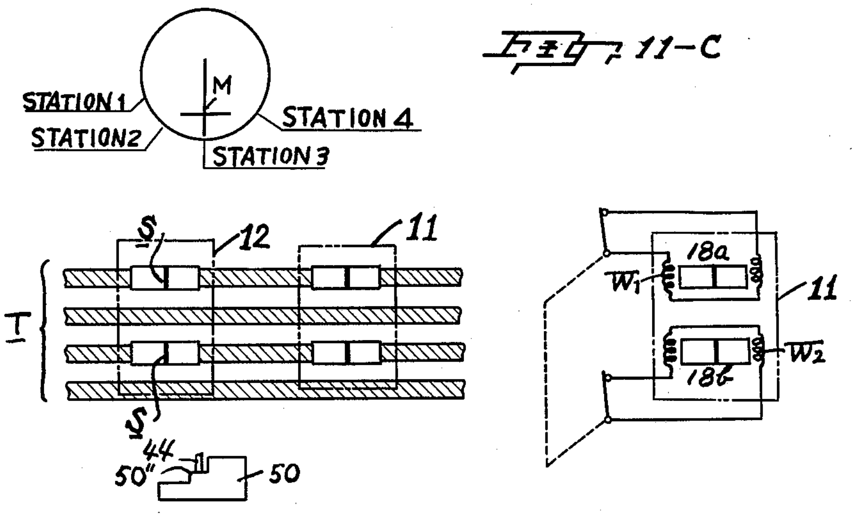
FIG. 11-C
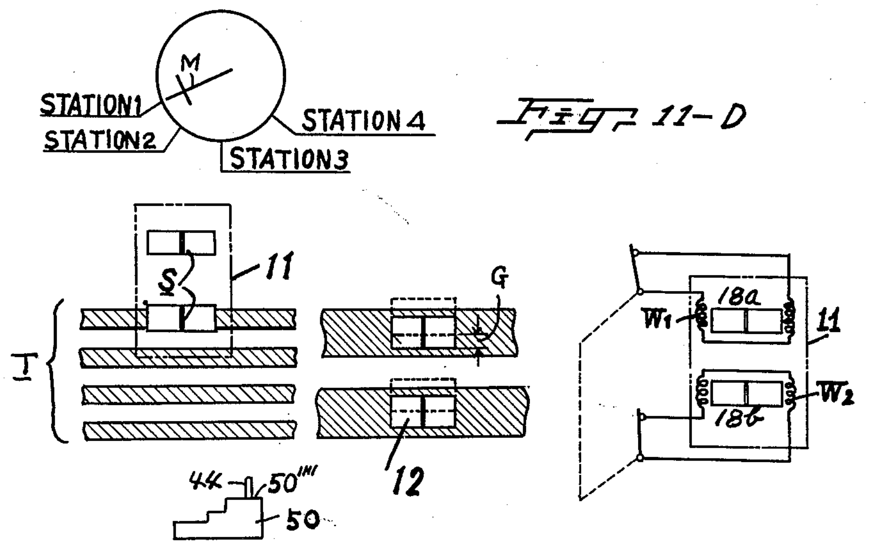
FIG. 11-D

United States Patent Office 3,190,970

Patented June 22, 1965

3,190,970

HEAD ASSEMBLY IN A MAGNETIC TAPE RECORDER

Katsuya Atsumi, Tokyo, Japan, assignor to Saburo Akai, Tokyo, Japan

Filed Nov. 16, 1960, Ser. No. 69,620
1 Claim. (Cl. 179—100.2)

This invention relates to improvements in head assemblies for magnetic recorders and more particularly to an adjustable head assembly allowing the head assembly to be adapted for recording, reproducing or erasing any one of the variously used tape recording systems or modes such as monaural and two and four lane stereo.

In the tape recording art, there are several commonly used and commercially available tape recording modes, such as a monaural single track recording mode, a two track stereo recording system, and a four track stereo recording system. All of these recording modes are employed with a single constant width magnetic tape. Usually, in a single track monaural system, a single track is recorded or reproduced in a portion of one half of a magnetic tape while the other half of the tape is blank in case it is desired to add another track for stereo or the like. For recording two track stereo, in one system each track is recorded near the center of each longitudinal half of the tape. For four track stereo recording, each half of the tape is commonly provided with two recording tracks, one of which is adjacent the outside edge of the tape and the other spaced equally between the edge of the track and the center line of the tape. It is difficult to provide a single head assembly for use in a magnetic recorder, and have the head assembly adaptable for recording, reproducing or erasing in any of these various modes as described above. It is therefore, an object of this invention to provide a recording playback and erase head assembly for a magnetic recorder to enable recording, reproducing or erasing in any of the various modes commonly used in magnetic tape recording by providing a single head assembly with multiple adjustments specifically adapted for the various types of recording modes.

In accordance with this object, the record-reproduce head as well as the erase head must be moved due to the geometry of the various recording modes. At the same time, it is necessary to change the electrical circuits controlling these heads. It is therefore, a further object of this invention to provide a unique interconnected mechanism to changeover from one recording mode to another and to positively control the electrical connections for recording mode changeover.

It is a further object of this invention to provide a single and manipulatable knob to control the changeover from one recording mode to another, including movement of the heads and all necessary switching action in accordance with the particular recording mode.

It is another object of this invention to provide for skew correction. That is, to correct the position of an air gap in a magnetic head relative to the track being recorded on a magnetic tape, it being desirable that the air gap be perpendicular to the tape track.

It is an additional object of this invention to provide thin erasing cores, the width of a recording track for specifically erasing a selected track or tracks in a multi-track tape and to eliminate cross talk.

It is also an object of this invention to provide an adjustable head assembly which is simple and inexpensive as well as being easy to construct.

Other objects and advantages of this invention will be pointed out in the following detailed description taken in connection with the accompanying drawings, which disclose, by way of example, the principle of this invention and the best mode which has been contemplated of applying that principle.

FIGS. 11–A to 11–D are schematic explanatory diagrams, illustrative of the adaptability of the head assembly, either to a monaural and binaural four track system, or to a twin-track stereophonic system, as may be desired.

A magnetic head assembly constructed in accordance with this invention comprises a combined record and playback head 11 and an erase head 12, which are adjustably vertically mounted on a base plate 13. The operating mechanism and guiding means therefor shall be described in detail hereinafter. There is provided a cover casing of bell-shape 14, which is secured to the base plate as illustrated in FIGS. 1 and 2.

Figures 5, 6, 7, 8:
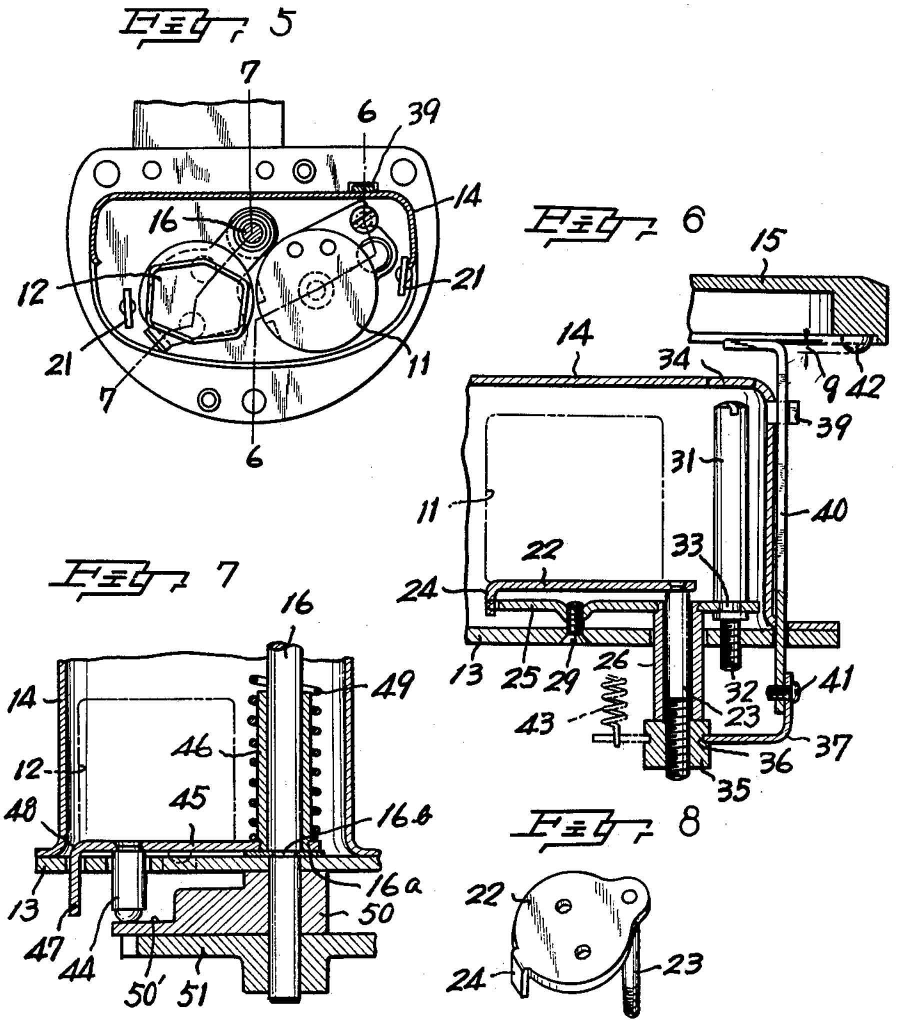
FIG. 5 is a top plan view of the head assembly shown in FIG. 1 with a portion of the cover removed for the sake of clarity.
FIG. 6 is an enlarged sectional view of a portion of the recording and reproducing head taken along lines 6—6 of FIG. 5.
FIG. 7 is another enlarged sectional view of the erase head assembly taken along lines 7—7 of FIG. 5.
FIG. 8 is a perspective view of an attachment plate for the recording and reproducing head.

An operating knob 15 is fixedly attached to a vertical shaft 16 at its upper end and above the top surface of cover 14, which shaft rotatably passes therethrough both the cover 14 and base 13, and is prevented from dropping out by the provision of a washer **16*a*, which engages a corresponding circular groove 16*b* in the shaft with a turning fit, such arrangement being best illustrated in FIG. 7. At the lower end of the vertical shaft extending below the base plate 13, a control stepped cam 50 and a segment gear 51** are fixedly mounted thereon in an overlapped manner, although the securing means are not shown in the drawings.

Figures 1, 2, 3, 4:
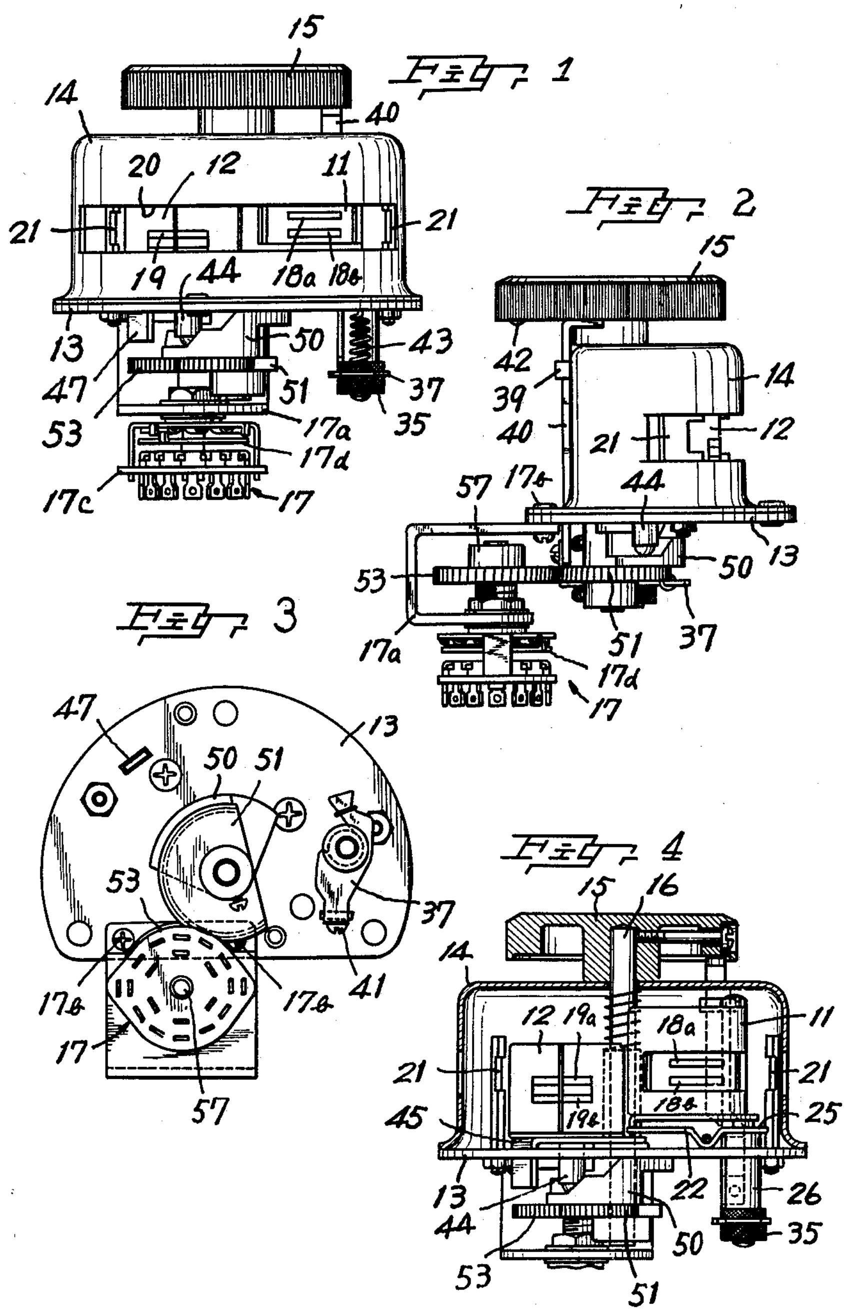
FIG. 1 is a front elevation view showing an entire head assembly according to this invention.
FIG. 2 is a side elevation view of the head shown in FIG. 1.
FIG. 3 is a bottom plan view of the head shown in FIG. 1.
FIG. 4 is a front elevation view with portions broken away and portions shown in section for the sake of clarity in illustrating the recording and reproducing as well as the erase head assemblies.

A channel-shaped hanger **17*a*, most clearly seen in FIG. 2, is fixedly attached to a peripheral region of the base plate 13 by screws 17*b* and mounts thereon a multi-pole rotary switching unit 17, comprising a stationary disc 17*c* and a rotatable disc 17*d* cooperating therewith. Rotary disc 17*d* is carried on a rotatable shaft 57, which mounts thereon in turn a gear 53 meshing with the gear 51. It is to be noted that the detailed electrical connections of the switch assembly 17 have been omitted for simplicity and only several terminals thereof are seen in FIGS. 1, 2 and 3, but the function of the switch will be explained hereinafter briefly in connection with several explanatory diagrams shown in FIG. 11–A to FIG. 11–D. From the foregoing, it will be clear that by manipulation of control knob 15, the rotary disc 17*d*** may be rotated for occasional positioning of the latter.

The combined head 11 per se is of the conventional design and thus has not been illustrated in detail. It will suffice to say that the combined head comprises a pair of spaced cores 18a and 18b, as well as drive coils $W_1$ and $W_2$ (FIG. 11–D) therefor, and that these coils are electrically connected with the rotary switch assembly 17 for being controlled by the latter, as will be described more in detail hereinafter.

Erase head 12 per se is also of the conventional design and comprises a pair of spaced cores 19a and 19b, as well as drive coils (not shown) therefor, these coils being adapted to be controlled by a switch means (not shown) as in the conventional technique. Although the necessary connections are omitted from the drawings for simplicity, the electric operation of these erase head cores shall be briefly described hereinafter in connection with several diagrammatic views shown in FIGS. 11–A to 11–D. As clearly illustrated in FIGS. 1 and 2, the cover casing 14 is formed therein with an elongated horizontal window 20; and a couple of spaced tape guides 21, each having a channel-shaped opening are mounted fixedly on the base plate 13 adjacent both extremities of said window 20 and in spaced relation therefrom.

Figure 9:
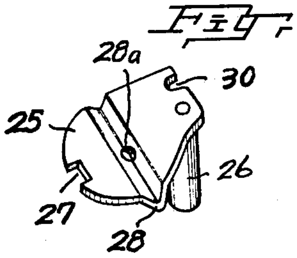
FIG. 9 is a perspective view of a skew adjusting plate for adjusting and fixing the skew of the recording and reproducing head.

As is commonly known, vertical slit gap S (FIG. 11) of the combined head 11 must be kept accurately at right angles to the travelling direction of the tape. To this end, an angle adjuster mechanism is provided for the combined head. Referring specifically to FIGS. 6, 8 and 9, the head 11, diagrammatically illustrated by a phantom line in FIG. 6, is fixedly attached to a mounting plate 22, which is provided on its one extreme region with a depending bolt 23 fixedly riveted thereto, and a depending tongue 24 on the opposite region, as most clearly seen from FIG. 8. On the other hand, a reception means 25 for the mount 22 is formed with a depending guide tube or sleeve 26 for reception of said bolt 23, and further at its center with a lateral groove 28 having a downwardly projecting V-shaped cross-section as shown, serving as a supporting edge or hinge. The reception means is still further provided with a recess 27 formed therein for slidable engagement with the tongue 24 of said mount 22, when assembled. At the center of the groove 28, in the longitudinal direction thereof, there is a tapped hole 28a for threadedly receiving an attaching screw 29.

When assembling the head 11 and the adjusting mechanism as explained above onto base plate 13, first a screw rod 31, having a circular groove 33 adjacent the threaded lower end 32 thereof is screwed in the base plate 13 to a proper degree as shown, and the reception means 25 is attached to the base by means of screw 29 as shown in FIG. 6, with its guide tube 26 projecting downwardly through a corresponding opening 13a and with a receiving recess 30 snugly engaging in the mating circular groove 33. Next, the head 11 and its mount 24 rigidly fixed therewith are assembled with the reception means 25 thus mounted, thereby the tongue is brought into slidable engagement with recess 27 and the depending stud 23 is passed through guide tube 26, thereupon a nut 35 is screwed onto the lower end of the stud, until it will abut against the bottom end of tube 26. It will be understood that by turning the screw rod 31 in one direction or the other by applying a torque by means of a screw driver (not shown) inserted through an access opening 34 formed in cover casing 14, the reception means 25, and thus head 11 and its mount 22, will be swiveled about lateral edge 28 in clockwise or counterclockwise direction, seen in FIG. 6, as the case may be, thereby providing the possibility of precisely adjusting the vertical positioning angle or skew of head 11.

In order to provide a possibility for control of the elevational position of the head 11 to a limited degree for such purpose to be described hereinafter, the nut 35 is provided in its periphery with a circular groove 36, which engages the forked end of a connecting member 37, which in turn, is fixedly connected by means of a screw 41 with the lower end of an operating bar 40 passing loosely through a guide opening 38, which is formed through both base plate 13 and cover 14. For the correct sliding positioning of the bar 40, guide member 39 is fixedly mounted on the back wall surface of cover 14, as clearly seen in FIGS. 2, 5 and 6. The uppermost end of bar 40 is turned inwardly, so as to be adapted to cooperate with an actuating projection 42 having a semispherical configuration and fixedly mounted on the bottom surface of the rim of selector knob 15. Between the forked end of connecting member 37 and the lower surface of base plate 13 at a suitable position thereof (not shown), a coil spring 43 is tensioned, so that head 11 and operating bar 40 are normally held in their upper position as shown in FIG. 6, wherein the bar is kept a small distance from the knob. When, however, the knob is turned to such a position that the actuating projection 42 is brought into and kept in pressure engagement with the turned in end of the bar 40 against the action of spring 43, downward motion is transmitted through members 40, 37, 35, 23 and 22 to the combined head 11, thereby the latter being lowered in parallel relation with plate 25 from the position shown in FIG. 6 a distance denoted by "*g*" in the same figure, and kept in this new position. In this position, the head mount 22 will snugly abut on the adjustably fixed plate 25.

Figure 10:
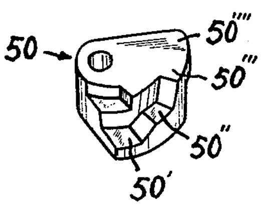
FIG. 10 is a perspective view of a multi-tier cam which controls movement of the erase head up and down vertically.

In FIG. 7, the erase head 12, which is again diagrammatically illustrated therein with a phantom line, is fixedly mounted on a mount plate 45, having a depending tongue 47 and a depending pin 44, both being made integral with the plate, and an upright guide tube 46 fixedly attached therewith on a horizontally extending projection therefrom for slidably guiding the cam operating shaft 16. The tongue 47 passes loosely through guide opening 48 of base 13. In order to assure the pressure engagement of the pin 44 with cooperating stepped cam 50, a coil spring 49 surrounding the guide tube 46 and abutting at its upper end against the bottom surface of base plate 13, urges the erase head unit downwardly. It will thus be clear that the head unit is mounted in a vertically slidable manner. The cam 50 has, as clearly seen from FIG. 10, three stepped surfaces 50′, 50″, and 50‴ engageable stepwise with the aforementioned pin 44, so that by turning the control knob 15, the erase head unit may be controlled in its height correspondingly.

The operation is as follows:

(1) When control knob 15 is turned so as to bring the indication mark M thereon in coincidence with "Station 1," as shown in FIG. 11–A, the uppermost step 50‴ is brought into engagement with operating pin 44, so that the erase head 12 is positioned at its highest level and the lower core 19a thereof is positioned to cover the track 1 of four track tape T. By this control operation, the combined head 11 will not be affected in any way in its position, so that it remains at its normal higher level and the upper core 18a of the head is brought into registration with the imaginary longitudinal axis of the track 1. By the above control operation, the rotary switch 17 is simultaneously operated, resulting in the upper core 18a being turned "on" and the lower core 18b of combined head 11 cut off, as diagrammatically illustrated in the right-hand figure in FIG. 11–A. It will be understood that under these conditions, either monaural recording or playback may be carried out with use of track 1 of the four track magnetic tape.

(2) Under the above-mentioned setup, track 4 may be used, when the tape is turned upside and down as it is commonly manipulated in the conventional art.

(3) The knob 15 may be manually turned until the indication mark M comes to "Station 3," so as to bring the lowest cam step 50′ into engagement with the operating pin 44 and thus to lower the erase head to its lowermost position, as clearly illustrated in FIG. 11–B. In this case, the upper core 19a of the erase head is positioned to cover track 3, while the combined head remains as before, so that the cores thereof are operative on track 1 and 3, respectively. By the present operative control, however, the upper core of the combined head will be cut-off by the simultaneous rotary movement of rotary switch 17, as illustrated in the right-hand figure of FIG. 11–B. In this case, cores 19*a* and 18*b* are operative, so that either monaural recording or playback can be carried out with the use of track 3 of the four track tape.

(4) Under the above conditions, when the tape is turned upside down, track 2 can be used for the same purpose.

In the foregoing, the erase head has been described to be active, that is to say, cases for monaural recording have been explained by way of example in using a four track tape; but, in the case of the corresponding playback operation, the erase head is naturally deenergized by means of a separate manual switch, (not shown) as in the case of conventional technique.

(5) In the case of stereophonic recording, the control knob is turned to "Station 2" and thus the second step 50'' of cam 50 is brought into engagement with operating pin 44. By this operation, the erase head is positioned at its intermediate level, with its cores covering tracks 1 and 3, respectively, while the combined head is kept mained as before, as clearly illustrated in FIG. 11–C. In this case, the rotary switch is simultaneously and automatically so manipulated that both cores of the combined head are kept alive, as seen from the same figure, to the right. The cores of the erase head must be also kept alive by manually switching on.

If the tape is turned upside down, tracks 4 and 2 are effective.

When the stereophonic playback is used with this four track tape, the erase head is naturally deenergized by means of the aforementioned additional manual switch.

(6) When it is desired to enjoy a stereophonic playback with the use of a commercially available double-track recorded tape, the knob is turned to "Station 4." In this case, the uppermost surface 50'''' of the cam, which surface is at the same level as said uppermost step 50''', is brought into engagement with operating pin 44, so that the erase head is kept in its highest position as was explained under above item (1). At the same time, the projection 42 is brought into cooperation with the uppermost end of operating bar 40 to lower the latter a small distance "*g*" as denoted in FIG. 6 and thus lower the combined head 11 correspondingly, as was already described hereinbefore. Why this offset distance should be compensated for can be readily understood at a glance, when comparing the broken-lined position suitable for four track setup with the full-lined position of the same head for twin track setup as shown in FIG. 11–D. The distance "*g*" corresponds to the off-set distance "G," which will appear when the combined head is shifted from four track setup as in the present case. It will thus be clear that by the present manipulation of control knob 15, the off-set gap "G" can be satisfactorily compensated for as illustrated in FIG. 11–D, thus resulting in the desired operative alignment of the combined head with the twin tracks. At the same time, the additional manual switch is so operated that the erase head is electrically cut-off.

It will be seen that I have provided a new and improved head assembly for a magnetic tape recorder which facilitates the rapid and selective positioning of the two head units of the twin core type included therein on any selected tracks of four track tape and twin track tape in modes of the monaural and the binaural operation of the machine, in linked relation with the head switching means, by manipulating substantially a single control knob.

It will, of course, be understood that various changes may be made in the form, details, arrangement and proportions of the parts without departing from the scope of my invention which consists of the matter shown and described herein and set forth in the appended claim.

What is claimed is:

A magnetic head assembly for recording, reproducing and erasing in various modes used in magnetic recorders, the head assembly comprising in combination;

(a) a base plate, (b) a record-reproduce head including at least two cores, (c) means for supporting said record-reproduce head selectively vertically adjustable over a small distance above the base plate, (d) an erase head including at least two cores, (e) means supporting the erase head for selective vertical adjustment to more than two discrete positions above the base plate, (f) a housing substantially enclosing the record-reproduce and erase heads, (g) a rotary multi-pole electric switch for controlling the recording and reproducing circuits carried by the base plate, (h) a rotary actuating shaft including an operating handle, the shaft extending upward from the base plate and the handle being outside the housing, (i) a multi-tier cam on the lower end of the actuating shaft for accomplishing the selective vertical adjustment of the erase head to align selected cores of the erase and read-reproduce heads on the same track for the various recording modes, (j) and means mechanically interconnecting the rotary actuating shaft and the rotary electric multi-pole switch for simultaneously actuating the desired electrical circuit as the erase head is vertically positioned, (k) an actuating rod rigidly interconnected with the vertically adjustably supported record-reproduce head and (m) a cam on the operating handle for contacting the actuating rod to move said rod vertically and thereby cause the selective vertical movement of the record-reproduce head.

References Cited by the Examiner

UNITED STATES PATENTS

| | | | |
|---|---|---|---|
| 2,468,198 | 4/49 | Heller | 179—100.2 |
| 2,898,113 | 8/59 | Namenyi-Katz | 179—100.2 |
| 2,958,736 | 11/60 | Saburo Akai | 179—100.2 |
| 2,985,723 | 5/61 | Schrober | 179—100.2 |

IRVING L. SRAGOW, *Primary Examiner.*

NEWTON N. LOVEWELL, *Examiner.*